United States Patent
Sigal et al.

(10) Patent No.: US 10,726,206 B2
(45) Date of Patent: Jul. 28, 2020

(54) VISUAL REFERENCE RESOLUTION USING ATTENTION MEMORY FOR VISUAL DIALOG

(71) Applicant: Disney Enterprises, Inc., Burbank, CA (US)

(72) Inventors: Leonid Sigal, Vancouver (CA); Andreas Lehrmann, Pittsburgh, PA (US); Paul Hongsuck Seo, Pohang (KR)

(73) Assignee: Disney Enterprises, Inc., Burbank, CA (US)

(*) Notice: Subject to any disclaimer, the term of this patent is extended or adjusted under 35 U.S.C. 154(b) by 62 days.

(21) Appl. No.: 15/884,339

(22) Filed: Jan. 30, 2018

(65) Prior Publication Data
US 2019/0236136 A1  Aug. 1, 2019

(51) Int. Cl.
| | | |
|---|---|---|
| *G06F 17/27* | (2006.01) | |
| *G06N 3/04* | (2006.01) | |
| *G06N 3/08* | (2006.01) | |
| *G06F 40/30* | (2020.01) | |
| *G06F 40/216* | (2020.01) | |

(52) U.S. Cl.
CPC ............ *G06F 40/30* (2020.01); *G06F 40/216* (2020.01); *G06N 3/04* (2013.01); *G06N 3/0445* (2013.01); *G06N 3/0454* (2013.01); *G06N 3/08* (2013.01)

(58) Field of Classification Search
CPC .... G06F 17/2785; G06N 3/04; G06N 3/0445; G06N 3/0454; G06N 3/08
See application file for complete search history.

(56) References Cited

U.S. PATENT DOCUMENTS

| | | | | |
|---|---|---|---|---|
| 8,392,435 | B1* | 3/2013 | Yamauchi | G06F 16/3322 707/749 |
| 9,747,390 | B2* | 8/2017 | Cooper | G06F 17/2735 |
| 10,275,485 | B2* | 4/2019 | Joshi | G06F 16/29 |
| 2006/0224587 | A1* | 10/2006 | Zamir | G06F 16/9535 |
| 2009/0089044 | A1* | 4/2009 | Cooper | G06F 17/275 704/9 |

(Continued)

OTHER PUBLICATIONS

Das et al. "Visual Dialog", arXiv:1611.08669v5 [cs.CV], In Conference on Computer Vision and Pattern Recognition, Aug. 1, 2017, 23 pages.

(Continued)

*Primary Examiner* — Mohammad K Islam
(74) *Attorney, Agent, or Firm* — Artegis Law Group, LLP (57) ABSTRACT

A dialog engine configured to answer a sequence of questions related to an image. An attention module residing in the dialog engine includes an attention retrieval process and a tentative attention process. The attention retrieval process retrieves a relevant attention map that may have previously been used to answer a previous query. The tentative attention process generates a tentative attention map based on an image and other input parameters. The attention module combines the relevant attention map and the tentative attention map to generate a fused attention map. Based on the fused attention map, the dialog engine generates a response to the query. Finally, the dialog engine stores the fused attention map in an attention memory for use in answering future queries.

20 Claims, 6 Drawing Sheets

(56) References Cited

U.S. PATENT DOCUMENTS

| | | | |
|---|---|---|---|
| 2010/0082604 A1* | 4/2010 | Gutt | G06F 16/3326 |
| | | | 707/721 |
| 2013/0041921 A1* | 2/2013 | Cooper | G06F 17/2735 |
| | | | 707/780 |

OTHER PUBLICATIONS

Vinyals et al. "Show and Tell: A Neural Image Caption Generator", In Conference on Computer Vision and Pattern Recognition, 2015, 9 pages.

Xu et al. "Show, Attend and Tell: Neural Image Caption Generation with Visual Attention", arXiv:1502.03044v3 [cs.LG], In International Conference on Machine Learning, Apr. 19, 2016, pp. 22.

Mun et al. "Text-guided Attention Model for Image Captioning", arXiv:1612.03557v1 [cs.CV], Association for the Advancement of Artificial Intelligence, Dec. 12, 2016, 7 pages.

Huang et al. "Unsupervised Visual-Linguistic Reference Resolution in Instructional Videos", understandarXiv: 1703.02521v2 [cs.CV], In Computer Vision and Pattern Recognition, May 20, 2017, 10 pages.

Rohrbach et al. "Grounding of Textual Phrases in Images by Reconstruction" arXiv:1511.03745v4 [cs.CV], In European Conference on Computer Vision, Feb. 17, 2017, 18 pages.

Mansimov et al. "Generating Images from Captions with a Attention", arXiv:1511.02793v2 [cs.LG], In International Conference on Learning Representations, Feb. 29, 2016, 12 pages.

Reed et al. "Generative Adversarial Text to Image Synthesis", feaarXiv:1605.05396v2 [cs.NE], In International Conference on Machine Learning, Jun. 5, 2016, 10 pages.

Noh et al. "Image Question Answering using Convolutional Neural Network with Dynamic Parameter Prediction", arXiv:1511.05756v1 [cs.CV], In Computer Vision and Pattern Recognition, 2016, 9 pages.

Yang et al. "Stacked Attention Networks for Image Question Answering", arXiv:1511.02274v2 [cs.LG], In Computer Vision and Pattern Recognition, Jan. 26, 2016, 11 pages.

Xu et al. "Ask, Attend and Answer: Exploring Question-Guided Spatial Attention for Visual Question Answering", arXiv:1511.05234v2 [cs.CV], In European Conference on Computer Vision, Mar. 19, 2016, 16 pages.

Andreas et al. "Deep Compositional Question Answering with Neural Module Networks", comarXiv: 1511.02799v4 [cs.CV], In Conference on Computer Vision and Pattern Recognition, Jul. 24, 2017, 10 pages.

Kim et al. "Hadamard Product for Low-Rank Bilinear Pooling", arXiv:1610.04325v4 [cs.CV], In International Conference on Learning Representations, Mar. 26, 2017, 14 pages.

Andreas et al. "Neural Module Networks", In Conference on Computer Vision and Pattern Recognition, 2016, 10 pages.

Lu et al. "Hierarchical Question-Image Co-Attention for Visual Question Answering", arXiv:1606.00061v5 [cs.CV], In Neural Information Processing Systems, 2016, 11 pages.

Fukui et al. "Multimodal Compact Bilinear Pooling for Visual Question Answering and Visual Grounding", arXiv:1606.01847v3 [cs.CV], In Empirical Methods in Natural Language Processing, Sep. 24, 2016, 12 pages.

Noh et al. "Training Recurrent Answering Units with Joint Loss Minimization for VQA", arXiv:1606.03647v2 [cs.CV], Sep. 30, 2016, 10 pages.

Agrawal et al. " VQA: Visual Question Answering", arXiv:1505.00468v7 [cs.CL], In International Conference on Computer Vision, Oct. 27, 2016, 25 pages.

Goyal et al. Making the V in VQA Matter: "Elevating the Role of Image Understanding in Visual Question Answering", arXiv:1612.00837v3 [cs.CV], In Conference on Computer Vision and Pattern Recognition, May 15, 2017, 11 pages.

Zhang et al. "Yin and Yang: Balancing and Answering Binary Visual Questions", arXiv:1511.05099v5 [cs.CL], In Conference on Computer Vision and Pattern Recognition, Apr. 19, 2016, 18 pages.

Malinowski et al. "Ask Your Neurons: A Neural-based Approach to Answering Questions about Images", arXiv:1505.01121v3 [cs.CV], In International Conference on Computer Vision, Oct. 1, 2015, 13 pages.

Mun et al. "MarioQA: Answering Questions by Watching Gameplay Videos", arXiv:1612.01669v2 [cs.CV], 2016, 9 pages.

Zhu et al. "Uncovering Temporal Context for Video Question and Answering", arXiv:1511.04670v1 [cs.CV], 2016, 10 pages.

Tapaswi et al. "MovieQA: Understanding Stories in Movies through Question-Answering", arXiv:1512.02902v2 [cs.CV], In Conference on Computer Vision and Pattern Recognition, Sep. 21, 2016, 10 pages.

Vries et al. "GuessWhat?! Visual Object Discovery through Multi-Modal Dialogue", arXiv:1611.08481v2 [cs.AI], In Conference on Computer Vision and Pattern Recognition, Feb. 6, 2017, 23 pages.

Das et al. "Learning Cooperative Visual Dialog Agents with Deep Reinforcement Learning", arXiv:1703.06585v2 [cs.CV], Mar. 21, 2017, 11 pages.

Strub et al. "End-to-End Optimization of Goal-Driven and Visually Grounded Dialogue Systems", arXiv:1703.05423v1, Mar. 15, 2017, 7 pages.

Seo et al. "Progressive Attention Networks for Visual Attribute Prediction", arXiv:1606.02393v5 [cs.CV], 2016, 19 pages.

Sukhbaatar et al. "End-To-End Memory Networks", arXiv:1503.08895v5 [cs.NE], In Neural Information Processing Systems, Nov. 24, 2015, 11 pages.

Weston et al. "Memory Networks", arXiv:1410.3916v11 [cs.AI], In l International Conference on Learning Representations, Nov. 29, 2015, 15 pages.

Kumar et al. "Ask Me Anything: Dynamic Memory Networks for Natural Language Processing", arXiv:1506.07285v5 [cs.CL], International Conference on Machine Learning, Mar. 5, 2016, 10 pages.

Xiong et al. "Dynamic Memory Networks for Visual and Textual Question Answering", arXiv:1603.01417v1 [cs.NE], In International Conference on Machine Learning, Mar. 4, 2016, 10 pages.

Miller et al. "Key-Value Memory Networks for Directly Reading Documents", arXiv:1606.03126v2 [cs.CL], In Empirical Methods in Natural Language Processing, Oct. 10, 2016, 10 pages.

Clark et al. "Deep Reinforcement Learning for Mention-Ranking Coreference Models", In Empirical Methods in Natural Language Processing, 2016, 6 pages.

Lark et al. "Improving Coreference Resolution by Learning Entity-Level Distributed Representations", In Association for Computational Linguistics, 2016, 11 pages.

Clark et al. "Entity-Centric Coreference Resolution with Model Stacking", In Association for Computational Linguistics, 2015, 11 pages.

Lin et al. "Microsoft COCO: Common Objects in Context", In European Conference on Computer Vision, 2014, 16 pages.

Simonyan et al. "Very Deep Convolutional Networks for Large-Scale Image Recognition", arXiv:1409.1556v6 [cs.CV], International Conference on Learning Representations, Apr. 10, 2015, 14 pages.

Deng et al. "ImageNet: A Large-Scale Hierarchical Image Database", in Conference on Computer Vision and Pattern Recognition, 2009, 8 pages.

Kingma et al. "ADAM: A Method for Stochastic Optimization", arXiv:1412.6980v9 [cs.LG], 2014, 15 pages.

* cited by examiner

FIG. 6

VISUAL REFERENCE RESOLUTION USING ATTENTION MEMORY FOR VISUAL DIALOG

BACKGROUND OF THE INVENTION

Field of the Invention

Embodiments of the present invention relate generally to artificial intelligence and, more specifically, to visual reference resolution using attention memory for visual dialog.

Description of the Related Art

Artificial Neural Networks (ANNs) can be trained to perform a wide variety of tasks. One such task is referred to as "visual question answering" (VQA). Once trained to perform the VQA task, a previous ANN architecture may analyze an image and then answer simple questions related to that image. For example, a previous ANN could analyze an image of a woman wearing a blue dress. Then, when asked to provide the color of the woman's dress, the ANN would answer "blue."

Previous ANNs trained to perform VQA tasks suffer from a significant drawback, however. Specifically, a previous ANN cannot resolve the meanings of semantic references included in questions. For instance, in the above example, if the previous ANN were asked the question, "what is the color of her hair," the ANN would not be able to resolve the pronoun "her" as indicating the woman in the image. The ANN, therefore, would not be able to answer the question correctly. As a general matter, because previous ANNs cannot resolve semantic references, previous ANNs have difficulty correctly interpreting follow-up questions that refer back to previous portions of a given dialog. Not being able to resolve semantic references limits the usefulness of ANNs for performing VQA tasks because questions posed by typical humans oftentimes contain numerous semantic references that relate to previous questions and answers within an ongoing dialog.

As the foregoing illustrates, what is needed in the art are techniques that enable ANNs to more effectively generate answers to questions that include semantic references.

SUMMARY OF THE INVENTION

Various embodiments of the present invention set forth a computer-implemented method for resolving semantic references via a neural network architecture, including generating, based on a current input that may include historical inputs, a tentative attention map indicating a first portion of the current input associated with a first query, retrieving, based on a set of previous inputs, a relevant attention map indicating a second portion of the current input associated with the set of previous inputs, fusing the tentative attention map with the relevant attention map to generate a fused attention map, and generating a first response to the first query based on the fused attention map, where the fused attention map is associated with at least one referent corresponding to at least one semantic reference included in the first query.

At least one advantage of the techniques described herein is that various artificial neural networks included in a dialog engine interoperate to generate a conversational context according to which semantic references can be resolved.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

As noted above, previous ANNs trained to perform the VQA task are only capable of answering certain types of questions that do not include semantic references and/or rely on previous portions of a dialog. These constraints limit the usefulness of conventional ANNs because normal human dialog makes extensive use of pronouns and other references.

To address these issues, embodiments of the invention include a dialog engine configured to answer a sequence of questions related to an image. An attention module residing in the dialog engine includes an attention retrieval process and a tentative attention process. The attention retrieval process retrieves a relevant attention map that may have previously been used to answer a previous query. The tentative attention process generates a tentative attention map based on an image and other input parameters. The attention module combines the relevant attention map and the tentative attention map to generate a fused attention map. Based on the fused attention map, the dialog engine generates a response to the query. Finally, the dialog engine stores the fused attention map in an attention memory for use in answering future queries.

An advantage of the above technique is that the dialog engine can rely on conversational context accumulated during the dialog in order to resolve references and other ambiguities. Accordingly, the dialog engine can answer a wider range of questions related to the image, thereby conferring a significant technical advantage compared to previous approaches.

Figure 1:
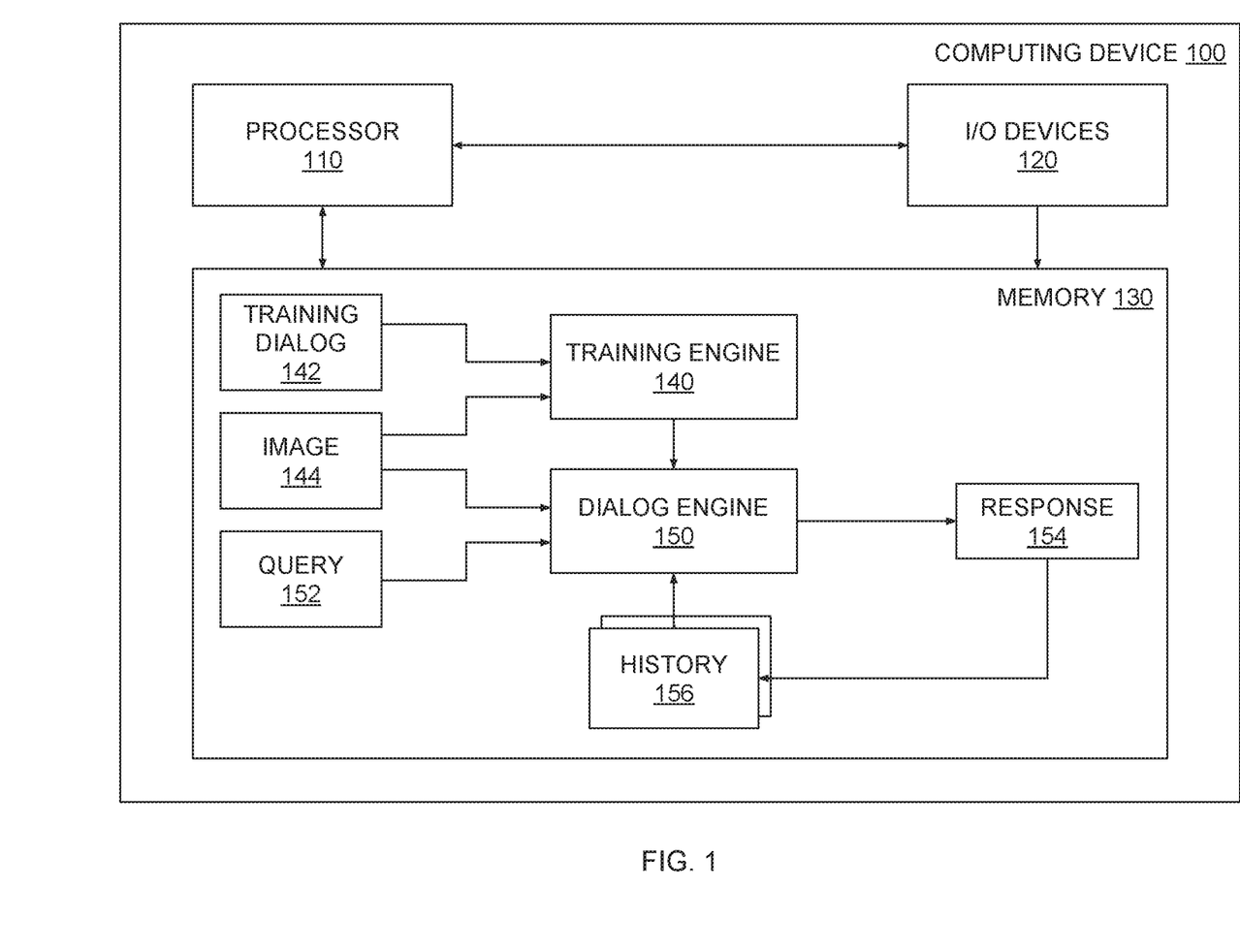
FIG. 1 is a system configured to perform one or more aspects of the present invention.

FIG. 1 is a system configured to perform one or more aspects of the present invention. As shown, a computing device 100 includes a processor 110, input/output (I/O) devices 120, and memory 130. Processor 110 includes any technically feasible set of hardware units configured to process data and execute software applications. Processor 110 could include, for example, one or more central processing units (CPUs), one or more graphics processing units (GPUs), one or more application specific integrated circuits (ASICs), and any combination thereof. I/O devices 120 include any technically feasible set of devices configured to perform input and/or output operations. I/O devices 120 could include, for example, a keyboard, a mouse, a display device, a speaker, a touchscreen, a universal serial bus (USB) port, and so forth. Memory 130 includes any technically feasible set of storage media configured to store data and software applications. Memory 130 could be, for example, a hard disk, a random access memory (RAM) module, a read-only memory (ROM), and and any combination thereof. Memory 130 includes a training engine 140 and a dialog engine 150.

Training engine 140 is a software module that, when executed by processor 110, trains dialog engine 150 to perform a visual dialog task. During training, training engine 140 adjusts weight values associated with a collection of artificial neural networks (ANNs) included in dialog engine 150 based on training dialog 142 and image 144. Training dialog 142 includes a set of queries pertaining to image 144 and a set of responses corresponding to those queries, both expressed via natural language. Based on training dialog 142 and image 144, training engine causes dialog engine 150 to better predict responses to future queries pertaining to image 144.

Once trained in the manner described above, dialog engine 150 can perform the visual dialog task based on image 144. In doing so, dialog engine 150 receives image 144 and a query 152. Query 152 includes a natural language expression, constructed in the form of a question, that requests information regarding features and relationships between features included in image 144. For example, if image 144 includes a grid of numbers, query 152 could request information regarding the style with which one of those numbers is printed. This particular example is described in greater detail below in conjunction with FIG. 6.

In response to query 152 and image 144, dialog engine 150 generates a response 154. Response 154 includes a natural language expression that may provide the information requested via query 152. Response 154 may further be generated based on history 156. History 156 includes previous queries and the answers thereto generated by dialog engine 150. Dialog engine 150 includes response 154 in history 156, and may then generate responses to future queries based on history 156, which accumulates over time. By considering history 156 in this manner, dialog engine 150 is capable of resolving potential ambiguities in queries, including semantic references such as pronouns, and contextual references that relate back to previous queries and the answers thereto. The mechanisms via which dialog engine 150 generates response 154 are described in greater detail below in conjunction with FIGS. 2-5.

Figure 2:
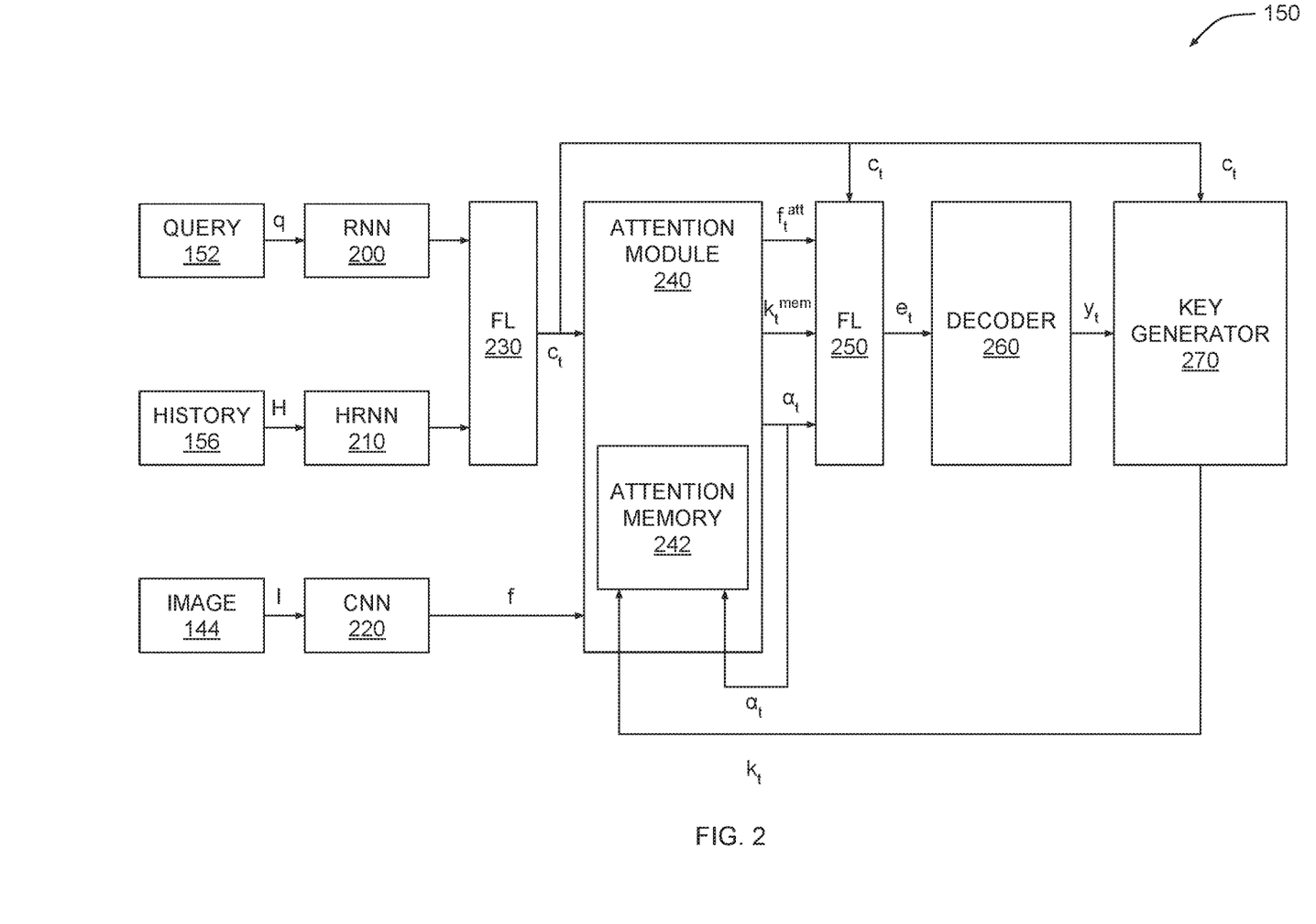
FIG. 2 is a more detailed illustration of the dialog engine of FIG. 1, according to various embodiments of the present invention.

FIG. 2 is a more detailed illustration of the dialog engine of FIG. 1, according to various embodiments of the present invention. As shown, dialog engine 150 includes a recurrent neural network (RNN) 200, a hierarchical recurrent neural network (HRNN) 210, a convolutional neural network (CNN) 220, a fusion layer (FL) 230, an attention module 240, a second FL 250, a decoder 260, and a key generator 270. RNN 200 and HRNN 210 are coupled to FL 230. CNN 220 and FL 230 are coupled to attention module 240. Attention module 240 is coupled to FL 250. FL 250 is coupled to decoder 260, and decoder 260 is coupled to key generator 270. Key generator 270 is coupled to attention module 240.

In operation, RNN 200 receives query 152 (shown here as q) and encodes the semantic meaning of q into a vector. RNN 200 may implement long-short term memory units to encode the meaning of q. In conjunction with this encoding, HRNN 210 receives history 156 (shown here as H) and encodes the semantic meaning of each query-response pair included in H into a vector. HRNN 210 may perform a similar encoding process as RNN 200, and may include a hierarchy of RNNs similar to RNN 210. RNN 200 and HRNN 210 output the encoded meanings of q and H to FL 230. FL 230 is a fully connected layer of artificial neurons that fuse the above encoded meanings to generate a fused encoding $c_t$. FL 230 outputs $c_t$ to attention module 240. Independently of the encoding of q and H, CNN 220 generates a feature map f that represents various features included in image 144 (shown here as I) as a set of feature vectors. CNN 220 outputs f to attention module 240.

Attention module 240 includes an attention memory 242 as well as a dynamic fusion layer (not shown here) that is configured to generate a fused attention map $a_t$ based on a relevant attention map and a tentative attention map. The relevant attention map includes a set of weight values indicating regions of image 144 previously relevant to previous queries. The tentative attention map includes a set of weight values indicating regions of image 144 that may be associated with query 152. The process of obtaining and fusing these two maps is described in greater detail below in conjunction with FIG. 3. As also described therein, attention module 240 generates a weighted feature map $f_t^{att}$ based on f and the fused attention map $a_t$. Attention module 240 outputs $a_t$ and $f_t^{att}$, along with a key $k_t^{mem}$, to FL 250.

FL 250 is a fully connected layer of artificial neurons configured to process the above data, in conjunction with $c_t$, in order to generate an encoded response $e_t$. This encoded response is a vector of values that represents the semantic meaning of a natural language response to q. Decoder 260 processes $e_t$ to generate response 154, shown here as $y_t$. In doing so, decoder 260 may implement an RNN to iteratively generate individual words of the response that, collectively, represent the semantic meaning encoded in $e_t$.

Key generator 270 processes $y_t$ along with $c_t$ to generate a key $k_t$. Key $k_t$ corresponds to $a_t$ and can be used to identify $a_t$ among other fused attention maps. Attention memory 242 receives $a_t$ and $k_t$ and stores $a_t$ based on $k_t$ for future use in responding to additional queries. The storage and retrieval of fused attention maps using keys is described in greater detail below in conjunction with FIG. 4.

Figure 6:
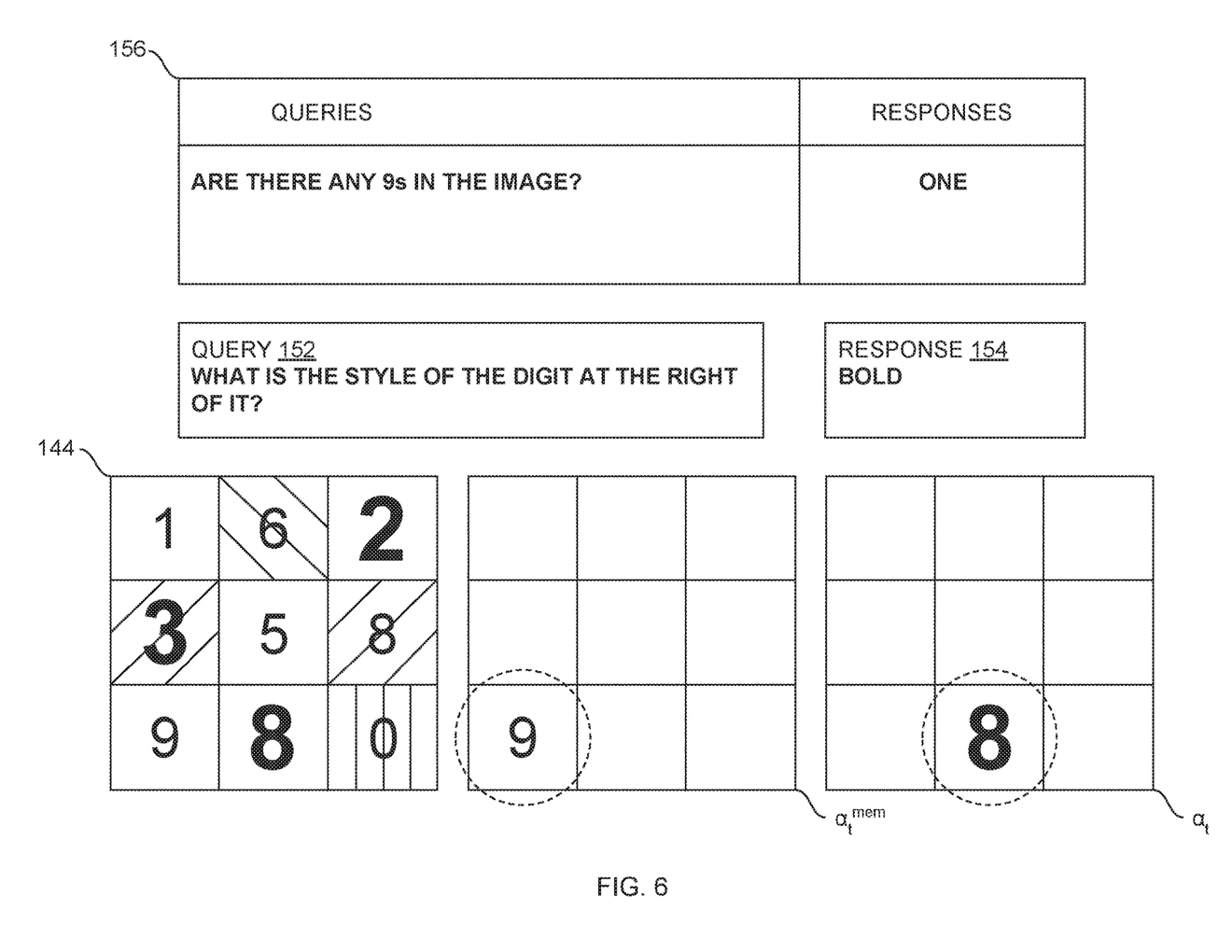
FIG. 6 illustrates a set of exemplary attention maps generated in conjunction with a dialog, according to various embodiments of the present invention.

According to the above technique, dialog engine 150 is capable of accurately answering a sequence of natural language questions that may include ambiguous semantic terms and may refer to previous questions and the answers thereto. For example, dialog engine 150 could generate the responses shown in the exemplary dialog below, which relate to an image of cars (not shown):

| Question | Answer |
|---|---|
| How many cars are there? | Two |
| What colors are they? | Red and white |

As seen in the above dialog, the second question includes the ambiguous term "they" which makes reference to the answer to the previous question. Dialog engine, via fusion of the relevant and tentative attention maps, is capable of resolving references such as these. FIG. 6 sets forth a more detailed example of how dialog engine 150 operates to resolve such references.

Figure 3:
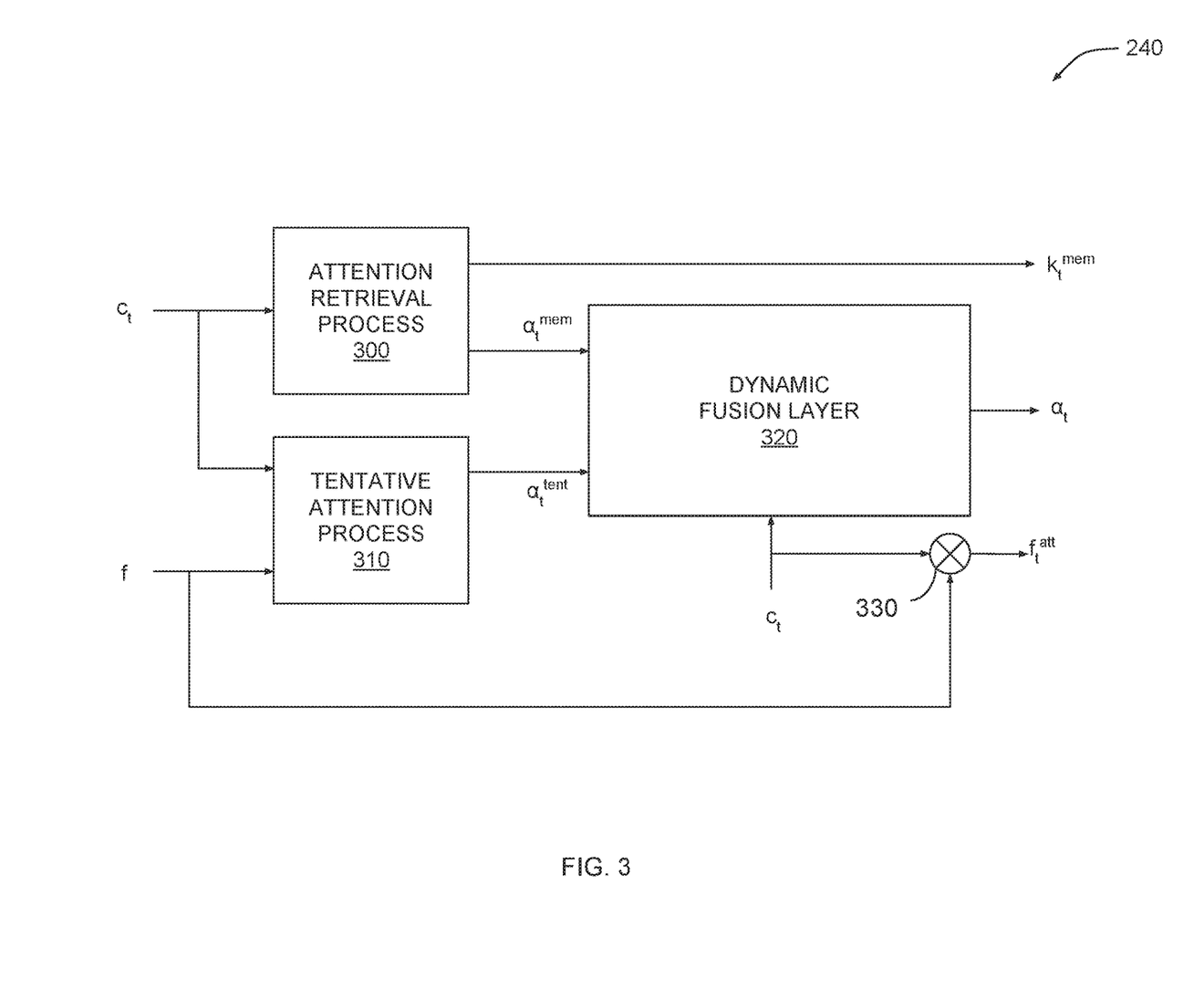
FIG. 3 is a more detailed illustration of the attention module of FIG. 2, according to various embodiments of the present invention.

FIG. 3 is a more detailed illustration of the attention module of FIG. 2, according to various embodiments of the present invention. As shown, attention module 240 includes attention retrieval process 300, tentative attention store 310, and dynamic fusion layer 320.

In operation, attention retrieval process 300 receives $c_t$ and then generates a key $k_t^{mem}$ that is used to locate relevant attention map $a_t^{mem}$ within a data store of attention maps, as further described below in conjunction with FIG. 4. Attention retrieval process 300 outputs $k_t^{mem}$ to FL 250 of FIG. 2 and also provides $a_t^{mem}$ to dynamic fusion layer 320.

In addition, tentative attention process 310 receives $c_t$ and f and then generates tentative attention map $a_t^{tent}$. In doing so tentative attention process 310 may implement the following two equations:

$$s_{t,n} = (W_c^{tent} c_t)^T (W_f^{tent} f_n)^T \quad \text{Equation 1}$$

$$a_t^{tent} = \text{softmax}(\{s_{t,n}, 1 < n < N\}) \quad \text{Equation 2}$$

In Equation 1, $W_c^{tent}$ is a projection matrix for the query and history encoding $c_t$, and $W_f^{tent}$ is a projection matrix for each feature vector $f_n$ included in the feature map f. In Equations 1 and 2, $s_{t,n}$ is an attention score for a feature located at spatial location n. Upon generating $a_t^{tent}$, tentative attention process 310 outputs $a_t^{tent}$ to dynamic fusion layer 320.

Dynamic fusion layer 320 is configured to fuse $a_t^{mem}$ with $a_t^{tent}$ to generate at. To fuse these two attention maps, dynamic fusion layer 320 may implement the following equation:

$$a_t(c_t) = \text{softmax}(W^{DPL}(c_t)\gamma(a_t^{tent}, a_t^{mem})) \quad \text{Equation 3}$$

In Equation 3, $W^{DPL}$ is a dynamically determined set of weights that depends on the encoded input $c_t$, and $\gamma(a_t^{tent}, a_t^{mem})$ is the flattened output of a convolution operation performed with $a_t^{tent}$ and $a_t^{mem}$ stacked together. In this manner, dynamic fusion layer 320 combines the tentative attention map $a_t^{tent}$ with relevant attention map $a_t^{mem}$ to generate the fused attention map $a_t$. Dynamic fusion layer 320 then outputs $a_t$ to FL 250.

Finally, attention module 240 generates $f_t^{att}$ via multiplier 330 by multiplying $a_t$ with f. Multiplier 330 may generally implement the following equation:

$$f_t^{att} = [a_t(c_t)]^T f \quad \text{Equation 4}$$

In the manner described thus far, attention module 240 generates each of $a_t$, $f_t^{att}$, and $k_t^{mem}$ to be further processed by FL 250.

Figure 4:
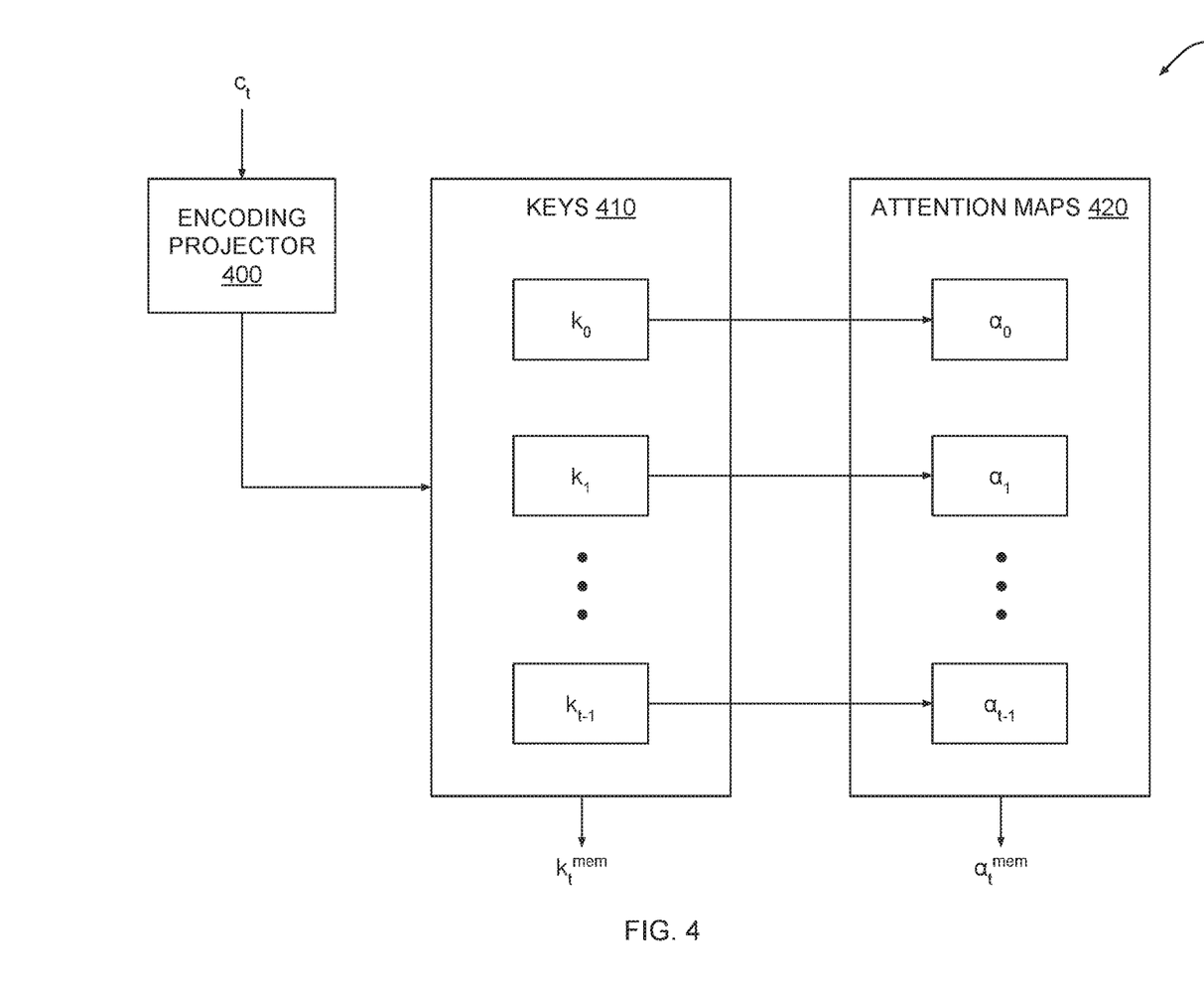
FIG. 4 is a more detailed illustration of the attention retrieval process of FIG. 3, according to various embodiments of the present invention.

FIG. 4 is a more detailed illustration of the attention retrieval process of FIG. 3, according to various embodiments of the present invention. As shown, attention retrieval process 300 includes an encoding projector 400, keys 410, and attention maps 420. Keys 410 includes various keys $k_0$, $k_1$, through $k_{t-1}$. Attention maps 420 includes various attention maps $a_0$, $a_1$ through $a_{t-1}$. Keys 410 and attention maps 420 may reside within attention memory 242. Attention retrieval process 300 retrieves the most relevant previous attention map based on a key comparison operation implemented via equations 5 and 6:

$$m_{t,\tau} = (W^{mem} c_t)^T k_t \quad \text{Equation 5}$$

$$\beta_t = \text{softmax}(\{m_{t,\tau}, 0 < \tau < t-1\}) \quad \text{Equation 6}$$

In equations 5 and 6, $W^{mem}$ projects the question and history encoding $c_t$ into the semantic space of the memory keys. The relevant attention $a_{mem}$ and key $k_{mem}$ are then retrieved based on the computed addressing vector $\beta_t$ using equations 7 and 8:

$$m_{t,\tau} = \Sigma_{\tau=0}^{t-1} \beta_{t,\tau} a_t \quad \text{Equation 7}$$

$$k_t^{mem} = \Sigma_{\tau=0}^{t-1} \beta_{t,\tau} k_t \quad \text{Equation 8}$$

Encoding projector 400 generally implements equations 5-8 to extract the most relevant attention map. In selecting a relevant attention map a, encoding projector 400 may also weight more recently selected attention maps over less recently selected attention maps, thereby incorporating the sequential nature of the dialog included in history 156 into the relevant attention selection process.

Referring now to both FIGS. 2 and 4, once decoder 260 generates response $y_t$, key generator 270 generates key $k_t$ based on $c_t$ and $y_t$, and then transmits these constructs to attention retrieval process 300 for storage in keys 410 and attention maps 420. Attention retrieval process 300 may, at a later time, retrieve the current fused attention map $a_t$ as a relevant attention map during future portions of the dialog.

Figure 5:
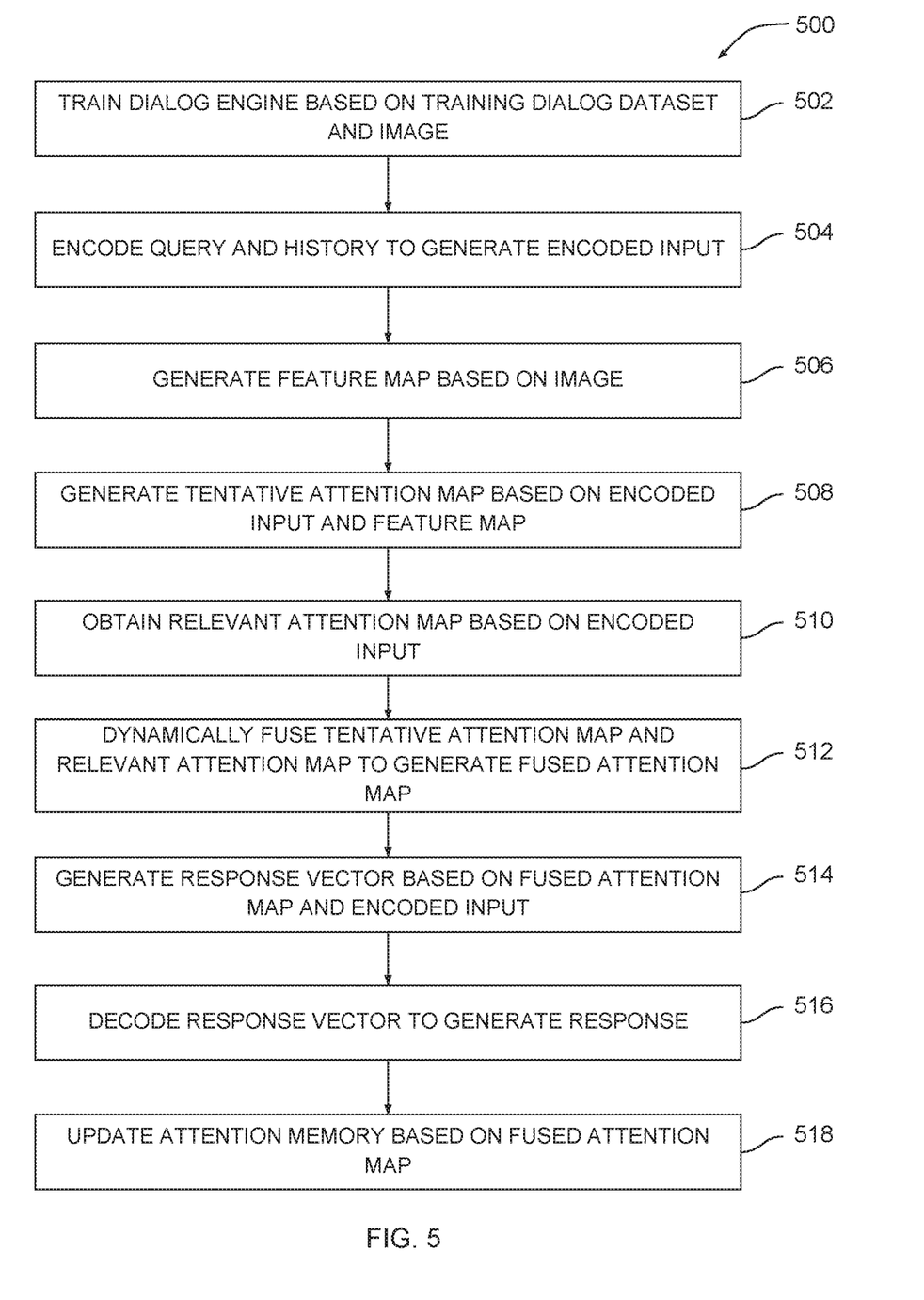
FIG. 5 is a flow diagram of method steps for configuring an artificial neural network to resolve semantic references that occur in questions, according to various embodiments of the present invention.

FIG. 5 is a flow diagram of method steps for configuring an artificial neural network to resolve semantic references that occur in questions, according to various embodiments of the present invention. Although the method steps are described in conjunction with the systems of FIGS. 1-4, persons skilled in the art will understand that any system configured to perform the method steps, in any order, is within the scope of the present invention.

As shown, a method 500 begins at step 502, where training engine 140 trains dialog engine 150 based on training dialog 142 and image 144. In doing so, training engine 140 may implement a gradient descent approach, such as backpropagation, to adjust weights included in the various networks of dialog engine 150 until some termination criterion is met. At step 504, RNN 200, HRNN 210, and FL 230 included in dialog engine 150 interoperate to encode query 152 and history 156 to generate an encoded input (shown as $c_t$ in FIGS. 2-4). At step 506, CNN 220 included in dialog engine 150 encodes image 144 to generate a feature map (shown as f in FIGS. 2-3).

At step 508, tentative attention process 310 generates a tentative attention map (shown as $a_t^{tent}$ in FIG. 3) based on the encoded input and feature map generated via steps 502 and 504, respectively. At step 510, attention retrieval process 300 obtains a relevant attention map (shown as $a_t^{mem}$ in FIG. 3) based on the encoded input. At step 512, dynamic fusion layer 320 generates a set of dynamic weights 322 and then dynamically fuses the tentative attention map and the relevant attention map generated via steps 508 and 510, respectively, to generate fused attention map (shown as $a_t$ in FIGS. 2-3).

At step 514, FL 250 generates a response vector (shown as $e_t$ in FIG. 2) based on the fused attention map and the encoded input, among other inputs. The response vector encodes the meaning of a response to query 152 in reference to image 144. At step 516, decoder 260 decodes response vector to generate a response (shown as $y_t$ in FIG. 2). Decoder 260 may implement a RNN to iteratively generate sequential semantic elements that represent the response vector in natural language. At step 518, attention retrieval process 300 updates attention memory 242 based on the fused attention map and also based on a key generated by key generator 270 for that fused attention map (shown in FIG. 2 as $k_t$).

Via the method 500, dialog engine 150 dynamically generates an attention map that indicates portions of image 144 that are relevant to an ongoing dialog. FIG. 6 sets forth one example of such a dialog.

FIG. 6 illustrates exemplary attention maps generated in conjunction with a dialog, according to various embodiments of the present invention. As shown, history 156 includes an example question pertaining to image 144. Image 144, in this example, includes a grid of numbers written in various styles against different backgrounds. The first question in history 156 is relatively straightforward and can be answered by dialog engine 150 primarily via the tentative attention processes described above. The question expressed in query 152, however, includes the pronoun "it" which refers to the 9 (the referent associated with "it") indicated by the previous question included in history 156. Based on history 156 and query 152, dialog engine 150 generates $a_t^{mem}$ which resolves that pronoun to the relevant region of image 144, in this case the 9 at lower left. Then, dialog engine 150 generates $a_t$ to indicate the portion of image 144 directly pertaining to query 152, in this example the bold 8. Finally, dialog engine 150 generates response 154 to answer query 152.

Referring generally to FIGS. 1-6, the techniques described thus far allow dialog engine 150 to operate in a context-aware fashion that permits a natural question and answer process to occur. In particular, the architectural arrangement of artificial neural networks, and the interoperation of those networks, allows potentially ambiguous semantic references to be resolved to corresponding referents. Although these techniques have been described in relation to answering questions pertaining to an image, persons skilled in the art will understand how these techniques can be applied to answering questions pertaining to other forms of data. For example, dialog engine 150 could be trained to answer questions related to a story. As a general matter, dialog engine 150 may be trained with any form of data and an associated training dialog related to that data.

In sum, a dialog engine configured to answer a sequence of questions related to an image. An attention module residing in the dialog engine includes an attention retrieval process and a tentative attention process. The attention retrieval process retrieves a relevant attention map that may have previously been used to answer a previous query. The tentative attention process generates a tentative attention map based on an image and other input parameters. The attention module combines the relevant attention map and the tentative attention map to generate a fused attention map. Based on the fused attention map, the dialog engine generates a response to the query. Finally, the dialog engine stores the fused attention map in an attention memory for use in answering future queries.

An advantage of the above technique is that the various artificial neural networks included in the dialog engine interoperate to generate a conversational context that accumulates during the dialog. That conversational context can be used to resolve references and other ambiguities, thereby matching potentially ambiguous references to discrete referents included in images. Accordingly, the dialog engine can answer a wider range of questions related to the image compared to previous techniques and associated architectures, thereby conferring a significant technical advantage compared to those previous approaches and architectures.

Any and all combinations of any of the claim elements recited in any of the claims and/or any elements described in this application, in any fashion, fall within the contemplated scope of the present invention and protection.

1. Some embodiments include a computer-implemented method for resolving semantic references via a neural network architecture, the method comprising: generating, based on a current input, a tentative attention map indicating a first portion of the current input associated with a first query, retrieving, based on a set of previous inputs, a relevant attention map indicating a second portion of the current input associated with the set of previous inputs, fusing the tentative attention map with the relevant attention map to generate a fused attention map, and generating a first response to the first query based on the fused attention map, wherein the fused attention map is associated with at least one referent corresponding to at least one semantic reference included in the first query.

2. The computer-implemented method of clause 1, wherein the tentative attention map comprises a grid of values, and each value corresponds to a different portion of an image included in the current input.

3. The computer-implemented method of any of clauses 1, and 2, wherein the relevant attention map comprises a grid of values, and each value corresponds to a different portion of an image included in the current input.

4. The computer-implemented method of any of clauses 1, 2, and 3, wherein the current input includes the query and an image, and the query includes a natural language expression associated with the image.

5. The computer-implemented method of any of clauses 1, 2, 3, and 4, wherein the current input includes the set of previous inputs, and each previous input comprises a previous query associated with an image included in the current input and a previous response to the previous query.

6. The computer-implemented method of any of clauses 1, 2, 3, 4, and 5, wherein retrieving the relevant attention map comprises: projecting the current input into a semantic space to generate a key, and extracting the relevant attention map from a set of relevant attention maps based on the key.

7. The computer-implemented method of any of clauses 1, 2, 3, 4, 5, and 6, wherein the relevant attention map is retrieved from a set of relevant attention maps generated in response to the set of previous inputs.

8. The computer-implemented method of any of clauses 1, 2, 3, 4, 5, 6, and 7, further comprising generating the current input by: encoding the query via a recurrent neural network to generate an encoded query, encoding the previous input via a hierarchical neural network to generate an encoded input history, encoding an image via a convolutional neural network to generate a feature map.

9. The computer-implemented method of any of clauses 1, 2, 3, 4, 5, 6, 7, and 8, wherein fusing the tentative attention map with the relevant attention map comprises: generating a set of weights based on the current input, stacking the tentative attention map and the relevant attention map to generate an attention map stack, performing a convolution operation with the attention map stack to generate a convolved map, and applying the set of weights to the convolved map to produce the fused attention map.

10. The computer-implemented method of any of clauses 1, 2, 3, 4, 5, 6, 7, 8, and 9, further comprising: generating a key based on the fused attention map, and storing the key and the fused attention map in an attention memory that includes the relevant attention map.

11. A non-transitory computer-readable medium including program instructions that, when executed by a processor, causes the processor to resolve semantic references via a neural network architecture by performing the steps of: generating, based on a current input, a tentative attention map indicating a first portion of the current input associated with a first query, retrieving, based on a set of previous inputs, a relevant attention map indicating a second portion of the current input associated with the set of previous inputs, fusing the tentative attention map with the relevant attention map to generate a fused attention map, and generating a first response to the first query based on the fused attention map, wherein the fused attention map is associated with at least one referent corresponding to at least one semantic reference included in the query.

12. The non-transitory computer-readable medium of clause 11, wherein the tentative attention map comprises a grid of values, and each value corresponds to a different portion of an image included in the current input.

13. The non-transitory computer-readable medium of any of clauses 10, 11, and 12, wherein the relevant attention map comprises a grid of values, and each value corresponds to a different portion of an image included in the current input.

14. The non-transitory computer-readable medium of any of clauses 10, 11, 12, and 13, wherein the current input includes the query and an image, and the query includes a natural language expression associated with the image.

15. The non-transitory computer-readable medium of any of clauses 10, 11, 12, 13, and 14, wherein the current input includes the set of previous inputs, and each previous input comprises a previous query associated with an image included in the current input and a previous response to the previous query.

16. The non-transitory computer-readable medium of any of clauses 10, 11, 12, 13, 14, and 15, wherein the relevant attention map is retrieved from a set of relevant attention maps generated in response to the set of previous inputs.

17. The non-transitory computer-readable medium of any of clauses 10, 11, 12, 13, 14, 15, and 16, further comprising the step of generating the current input by: encoding the query via a recurrent neural network to generate an encoded query, encoding the previous input via a hierarchical neural network to generate an encoded input history, encoding an image via a convolutional neural network to generate a feature map.

18. The non-transitory computer-readable medium of any of clauses 10, 11, 12, 13, 14, 15, 16, and 17, wherein the step of fusing the tentative attention map with the relevant attention map comprises: generating a set of weights based on the current input, stacking the tentative attention map and the relevant attention map to generate an attention map stack, performing a convolution operation with the attention map stack to generate a convolved map, and applying the set of weights to the convolved map to produce the fused attention map.

19. A system for resolving semantic references, comprising: a memory storing a dialog engine, and a processor that, upon executing the dialog engine, performs the steps of: generating, based on a current input, a tentative attention map indicating a first portion of the current input associated with a first query, retrieving, based on a set of previous inputs, a relevant attention map indicating a second portion of the current input associated with the set of previous inputs, fusing the tentative attention map with the relevant attention map to generate a fused attention map, and generating a first response to the first query based on the fused attention map, wherein the fused attention map is associated with at least one referent corresponding to at least one semantic reference included in the query.

20. The system of clause 19, wherein the processor fuses the tentative attention map with the relevant attention map by performing the steps of: generating a set of weights based on the current input, stacking the tentative attention map and the relevant attention map to generate an attention map stack, performing a convolution operation with the attention map stack to generate a convolved map, and applying the set of weights to the convolved map to produce the fused attention map.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for resolving semantic references via a neural network architecture, the method comprising:
    generating, based on a current input, a tentative attention map indicating a first portion of an image associated with the current input, wherein the first portion of the image corresponds to a first query;
    retrieving, based on a set of previous inputs, a relevant attention map indicating a second portion of the image associated with the current input, wherein the second portion of the image corresponds to the set of previous inputs;
    fusing the tentative attention map with the relevant attention map to generate a fused attention map; and
    generating a first response to the first query based on the fused attention map, wherein the fused attention map is associated with at least one referent corresponding to at least one semantic reference included in the first query.

2. The computer-implemented method of claim 1, wherein the tentative attention map comprises a grid of values, and each value corresponds to a different portion of the image included in the current input.

3. The computer-implemented method of claim 1, wherein the relevant attention map comprises a grid of values, and each value corresponds to a different portion of the image included in the current input.

4. The computer-implemented method of claim 1, wherein the current input includes the first query and the image, and the first query includes a natural language expression associated with the image.

5. The computer-implemented method of claim 1, wherein the current input includes the set of previous inputs, and each previous input comprises a previous query associated with the image and a previous response to the previous query.

6. The computer-implemented method of claim 1, wherein retrieving the relevant attention map comprises:
    projecting the current input into a semantic space to generate a key; and
    extracting the relevant attention map from a set of relevant attention maps based on the key.

7. The computer-implemented method of claim 1, wherein the relevant attention map is retrieved from a set of relevant attention maps generated in response to the set of previous inputs.

8. The computer-implemented method of claim 1, further comprising generating the current input by:
    encoding the first query via a recurrent neural network to generate an encoded query;
    encoding the set of previous inputs via a hierarchical neural network to generate an encoded input history;
    encoding the image via a convolutional neural network to generate a feature map.

9. The computer-implemented method of claim 1, wherein fusing the tentative attention map with the relevant attention map comprises:
    generating a set of weights based on the current input;
    stacking the tentative attention map and the relevant attention map to generate an attention map stack;
    performing a convolution operation with the attention map stack to generate a convolved map; and
    applying the set of weights to the convolved map to produce the fused attention map.

10. The computer-implemented method of claim 1, further comprising:
    generating a key based on the fused attention map; and
    storing the key and the fused attention map in an attention memory that includes the relevant attention map.

11. A non-transitory computer-readable medium including program instructions that, when executed by a processor, causes the processor to resolve semantic references via a neural network architecture by performing the steps of:
    generating, based on a current input, a tentative attention map indicating a first portion of an image associated with the current input, wherein the first portion of the image corresponds to a first query;
    retrieving, based on a set of previous inputs, a relevant attention map indicating a second portion of the image associated with the current input, wherein the second portion of the image corresponds to the set of previous inputs;
    fusing the tentative attention map with the relevant attention map to generate a fused attention map; and
    generating a first response to the first query based on the fused attention map, wherein the fused attention map is associated with at least one referent corresponding to at least one semantic reference included in the first query.

12. The non-transitory computer-readable medium of claim 11, wherein the tentative attention map comprises a grid of values, and each value corresponds to a different portion of the image included in the current input.

13. The non-transitory computer-readable medium of claim 11, wherein the relevant attention map comprises a grid of values, and each value corresponds to a different portion of the image included in the current input.

14. The non-transitory computer-readable medium of claim 11, wherein the current input includes the first query and the image, and the first query includes a natural language expression associated with the image.

15. The non-transitory computer-readable medium of claim 11, wherein the current input includes the set of previous inputs, and each previous input comprises a previous query associated with the image and a previous response to the previous query.

16. The non-transitory computer-readable medium of claim 11, wherein the relevant attention map is retrieved from a set of relevant attention maps generated in response to the set of previous inputs.

17. The non-transitory computer-readable medium of claim 11, further comprising the step of generating the current input by:
- encoding the first query via a recurrent neural network to generate an encoded query;
- encoding the set of previous inputs via a hierarchical neural network to generate an encoded input history;
- encoding the image via a convolutional neural network to generate a feature map.

18. The non-transitory computer-readable medium of claim 11, wherein the step of fusing the tentative attention map with the relevant attention map comprises:
- generating a set of weights based on the current input;
- stacking the tentative attention map and the relevant attention map to generate an attention map stack;
- performing a convolution operation with the attention map stack to generate a convolved map; and
- applying the set of weights to the convolved map to produce the fused attention map.

19. A system for resolving semantic references, comprising:
- a memory storing a dialog engine; and
- a processor that, upon the dialog engine, performs the steps of:
    - generating, based on a current input, a tentative attention map indicating a first portion of an image associated with the current input, wherein the first portion of the image corresponds to a first query,
    - retrieving, based on a set of previous inputs, a relevant attention map indicating a second portion of the image associated with the current input, wherein the second portion of the image corresponds to the set of previous inputs,
    - fusing the tentative attention map with the relevant attention map to generate a fused attention map, and
    - generating a first response to the first query based on the fused attention map, wherein the fused attention map is associated with at least one referent corresponding to at least one semantic reference included in the first query.

20. The system of claim 19, wherein the processor fuses the tentative attention map with the relevant attention map by performing the steps of:
- generating a set of weights based on the current input;
- stacking the tentative attention map and the relevant attention map to generate an attention map stack;
- performing a convolution operation with the attention map stack to generate a convolved map; and
- applying the set of weights to the convolved map to produce the fused attention map.

* * * * *

UNITED STATES PATENT AND TRADEMARK OFFICE
CERTIFICATE OF CORRECTION

PATENT NO. : 10,726,206 B2
APPLICATION NO. : 15/884339
DATED : July 28, 2020
INVENTOR(S) : Leonid Sigal, Andreas Lehrmann and Paul Hongsuck Seo It is certified that error appears in the above-identified patent and that said Letters Patent is hereby corrected as shown below:

On the Title Page

Page 2, Column 2, (56) References Cited Lines 49-51:
Please delete "Lark et al. "Improving Coreference Resolution by Learning Entity-Level Distributed Representations", In Association for Computational Linguistics, 2016, 11 pages." and insert
--Clark et al. "Improving Coreference Resolution by Learning Entity-Level Distributed Representations", In Association for Computational Linguistics, 2016, 11 pages.--.

Signed and Sealed this
Twenty-second Day of September, 2020

Andrei Iancu
*Director of the United States Patent and Trademark Office*